United States Patent [19]

Scholl et al.

[11] Patent Number: 4,923,920

[45] Date of Patent: May 8, 1990

[54] MIXTURES OF ELASTOMER LATICES AND DISPERSIONS OF AROMATIC POLYCARBONATES, POLYESTERS OR POLYESTER CARBONATES AND PRODUCTS PRODUCED THEREFROM

[75] Inventors: Thomas Scholl, Meerbusch; Hermann Perrey, Krefeld; Martin Matner, Odenthal, all of Fed. Rep. of Germany

[73] Assignee: Bayer Aktiengesellschaft, Leverkusen

[21] Appl. No.: 208,655

[22] Filed: Jun. 20, 1988

[30] Foreign Application Priority Data

Jul. 1, 1987 [DE] Fed. Rep. of Germany ....... 3721766

[51] Int. Cl.$^5$ ............................................. C08L 73/00

[52] U.S. Cl. .................................... 524/501; 524/508; 524/513; 525/133; 525/146; 525/148; 525/166

[58] Field of Search ....................... 524/508, 513, 501; 525/146, 148, 468, 133

[56] References Cited

U.S. PATENT DOCUMENTS 3,041,297  6/1962  Battista ................................ 524/513

FOREIGN PATENT DOCUMENTS 4031537  8/1974  Japan .

Primary Examiner—Theodore E. Pertilla
Attorney, Agent, or Firm—Connolly and Hutz

[57] ABSTRACT

This invention relates to mixtures of at least one elastomer latex with at least one dispersion of an aromatic polycarbonate, aromatic polyester or aromatic polyester carbonate.

8 Claims, No Drawings

MIXTURES OF ELASTOMER LATICES AND DISPERSIONS OF AROMATIC POLYCARBONATES, POLYESTERS OR POLYESTER CARBONATES AND PRODUCTS PRODUCED THEREFROM

This invention relates to mixtures of at least one elastomer latex (I) with at least one dispersion (II) of an aromatic polycarbonate, aromatic polyester or aromatic polyester carbonate.

The elastomer components (I) according to the invention are generally aqueous dispersions of homopolymers and/or copolymers of preferably radically polymerizable unsaturated monomers.

Besides natural rubber latices, suitable elastomer components (I) include synthetic latices obtained by polymerization of conventional olefinically unsaturated monomers in aqueous emulsion. Suitable monomers are various radically polymerizable olefinically unsaturated compounds, for example mono- and diolefins, such as ethylene, propylene, butadiene, isoprene, 2-chloro-1,3-butadiene, styrene, vinyl toluene, α-methyl styrene, chlorostyrene, vinyl sulfonic acid and divinylbenzene, vinyl halides, such as vinyl chloride, vinylidene chloride, vinyl esters of linear or branched, aliphatic carboxylic acids, such as vinyl acetate, vinyl propionate, vinyl n-butyrate, vinyl pivalate, vinyl laurate and vinyl stearate, vinyl ethers, such as vinyl methyl ether, vinyl ethyl ether, vinyl n-butyl ether and vinyl sec.-butyl ether, esters of acrylic and methacrylic acid of mono-ols or polyols, such as methyl acrylate and methyl methacrylate, ethyl acrylate and ethyl methacrylate, butyl acrylates and butyl methacrylates, hexyl acrylates and hexyl methacrylates, 2-ethyl hexyl acrylate and 2-ethyl hexyl methacrylate, n-decyl acrylate and n-decyl methacrylate, n-dodecyl methacrylate, glycol monoacrylate and glycol monomethacrylate, butane-1,4-diol acrylate and butane-1,4-diol methacrylate, ethylene glycol-bis-acrylate and ethylene glycol-bis-methacrylate and trimethylolpropane trisacrylate and trimethylolpropane trismethacrylate, diesters and semiesters of unsaturated dicarboxylic acids, such as maleic acid, fumaric acid and itaconic acid di- and monomethyl ester, di- and monoethyl ester, di- and monobutyl ester and di- and monohexyl ester, α, β-unsaturated di- and monocarboxylic acids, such as acrylic acid, methacrylic acid, crotonic acid, maleic acid, fumaric acid and itaconic acid, amides, methylolamides and alkoxymethylamides of these α,β-unsaturated di- and monocarboxylic acids, such as acrylamide, methacrylamide, maleic acid amide, maleic acid imide, methylene-bis-(meth)acrylamide, N-methylol (meth)acrylamide, N-methoxymethyl (meth)acrylamide, allyl compounds, such as diallyl phthalate, and heterocyclic compounds, such as N-vinyl phthalimide, N-vinylpyrrolidone and N-vinyl imidazole. The monomers may be used individually or in combination with one another.

The polymerization of the above monomers may be carried out in the presence of emulsifiers, for which purpose the conventional nonionic or ionic emulsifiers may be used either individually or in combination with one another. The total quantity of emulsifier may be from 0.1 to 10% by weight, based on the monomers.

The emulsion polymerization may be initiated with radical formers, preferably with organic peroxide compounds, used in quantities of 0.01 to 2% by weight, based on monomer. Depending on the monomer combination, small quantities of regulators, for example mercaptans, halogenated hydrocarbons, may be used to control the molecular weight of the polymer. The emulsion polymerization may be carried out in two ways. The total quantity of monomers and most of the aqueous phase containing the emulsifiers may be initially introduced, the polymerization started by addition of the initiator and the rest of the aqueous phase added continuously or at intervals in the course of the polymerization. The so-called "monomer feed" technique may also be used. In this case, only part of the monomers and of the aqueous phase containing the emulsifier is initially introduced and, after the polymerization has been initiated, the rest of the monomers and of the aqueous phase are added continuously or at intervals commensurately with the conversion. The monomer added may be pre-emulsified in the aqueous phase. Both techniques are known.

Suitable components (II) are aqueous dispersions of aromatic polycarbonates, aromatic polyesters and aromatic polyester carbonates. Preferred aqueous dispersions contain thermoplastic aromatic polycarbonates obtained by reaction of diphenols, particularly dihydroxydiaryl alkanes, with phosgene or diesters of carbonic acid. In addition to the unsubstituted dihydroxydiaryl alkanes, it is also possible to use those of which the aryl radicals bear methyl groups or halogen atoms in the o- and/or m-position to the hydroxyl group. Branched polycarbonates are also suitable. Monophenols for example are used as chain terminators while trisphenols or tetraphenols for example are used as branching agents.

The polycarbonates generally have average molecular weights $M_W$ (weight average) of 10,000 to 100,000 and preferably of 20,000 to 40,000, as determined by measurement of the relative viscosity in $CHCl_2$ (concentration 0.5 g/100 ml) at 25° C.

Suitable diphenols are, for example, hydroquinone, resorcinol, 4,4'-dihydroxydiphenyl, bis-(hydroxyphenyl)alkanes, such as for example $C_1$–$C_8$ alkylene and $C_2$–$C_8$ alkylidene bisphenols, bis-(hydroxyphenyl)-cycloalkylenes, such as for example $C_5$–$C_{15}$ cycloalkylene and $C_5$–$C_{15}$ cycloalkylidene bisphenols, bis-(hydroxyphenyl)-sulfides, ethers, ketones, sulfoxides or sulfones. Other suitable diphenols are α,α'-bis-(hydroxyphenyl)-diisopropylbenzene and the corresponding nucleus-alkylated or nucleus-halogenated compounds. Preferred diphenols are polycarbonates based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5-dimethylphenyl)-2,2-propane (tetramethyl bisphenol A), bis-(4-hydroxyphenyl)-1,1-cyclohexane (bisphenol Z) and on trinuclear bisphenols, such as α,β'-bis-(4-hydroxyphenyl)-p-diisopropylbenzene.

Other suitable diphenols and the production of the polycarbonates are described, for example, in US-PSS 3,028,365, 3,062,781 and 3,879,347.

Preferred aqueous dispersions (II) also contain thermoplastic aromatic polyesters based on diphenols, terephthalic and isophthalic acid dichlorides (acid chloride ratio generally 7:3 to 3:7, preferably 1:1), chain terminators and, optionally, branching agents. Suitable diphenols, chain terminators and branching agents are the compounds mentioned above for the production of the polycarbonates.

The aromatic polyesters are prepared from the mixtures of the acid chlorides, diphenols, chain terminators and, optionally, branching agents by the process of interfacial polycondensation. The relative vicosity of the aromatic polyesters to be stabilized in accordance with the invention should generally be between 1.18 and 2.0 and preferably between 1.2 and 1.5, as measured on a $CH_2Cl_2$ solution (conc. 0.5 g/100 ml) at 25° C.

The mixtures according to the invention of elastomer (I) and thermoplast dispersions (II) generally contain 0.1 to 50% by weight of thermoplast, based on the total solids content. Particularly preferred mixtures according to the invention contain from 1 to 25% by weight of thermoplast, based on the total solids content.

The mixtures according to the invention of elastomer latices (I) and dispersions (II) of aromatic polycarbonates, aromatic polyesters and polyester carbonates are stable in storage and are suitable for the production of products showing improved mechanical properties, including for example increased tear propagation resistance and increased structural strength and also greater ageing resistance, than the products produced from conventional rubber latices.

Japanese patent specification J 7 4031 537 describes dental impression compounds prepared from mixtures of SBR latices with at least one thermoplast dispersion by coagulation with inorganic electrolytes. The thermoplast dispersions mentioned include a polycarbonate dispersion. The advantages of the dental impression compounds mentioned lie in higher dimensional stability.

However, it was not found in J 7 4031 537 that both coagulation products and also vulcanization products of elastomer latices and, in particular, polycarbonate, aromatic polyester carbonates and aromatic polyesters show greater ageing resistance, higher tear propagation resistance and higher structural strength values.

To prepare the mixtures according to the invention of elastomer (I) and thermoplast dispersion (II), elastomer dispersions, for example, of the natural latex (NR) type of aqueous colloidal dispersions of copolymers of styrene and butadiene (SBR), of styrene, butadiene and acrylonitrile (N SBR), of styrene, butadiene and methacrylic acid (X SBR), of styrene, butadiene, acrylonitrile and methacrylic acid (XNSBR), of acrylonitrile and butadiene (NBR), of acrylonitrile, butadiene and methacrylic acid (X NBR), of 2-chlorobutadiene and methacrylic acid (XCR), of 2-chlorobutadiene and dichlorobutadiene (CR) or the homopolymer of 2-chlorobutadiene (CR) are mixed with dispersions (II) of aromatic polycarbonates, aromatic polyesters and aromatic polyester carbonates, preferably at temperatures of 10° to 50° C.

However, aqueous dispersions (II) of aromatic polycarbonates, aromatic polyesters and aromatic polyester carbonates may also be used in the form of an aqueous paste in the emulsion polymerization for the preparation of elastomer component (I). Accordingly, component (I) and component (II) are mixed so to speak in "statu nascendi".

To prepare stable polycarbonate and aromatic polyester carbonate dispersions, a solution of the thermoplast may be initially introduced. Suitable solvents are, for example, methylene chloride, chloroform, chlorobenzene. An aqueous solution of a protective colloid (for example polyvinyl alcohol, polyvinylpyrrolidone, methyl cellulose, partially hydrolyzed polyvinyl acetate), preferred concentration 1 to 10% by weight, and optionally other surfactants (for example alkyl sulfonates, alkyl benzenesulfonates, alcohol sulfates, alkoxylated fatty alcohols and amines, alkoxylated alkylphenols) is added to the solution initially introduced, followed by dispersion using conventional dispersion units (Ultraturrax, dissolver, shear gap dissolver). The organic solvent is then removed by heating, optionally under light vacuum.

The present invention also relates to the coagulates obtained from the new dispersions and to the vulcanizates obtained therefrom by crosslinking.

Both products surprisingly show distinctly better mechanical and chemical properties and also a distinct improvement in ageing resistance compared with the uncrosslinked or crosslinked coagulates of pure elastomer dispersions.

The new mixtures of elastomer and thermoplast dispersions are suitable inter alia for the production of dip coatings, impregnations, coatings and laminations of fabrics and paper; binders for animal, vegetable and synthetic fibers, modifications of bituminous compositions for surfacing roads, building protection and protective paints, adhesives, sealing compounds and as binders for friction coverings.

The percentages of the following Examples are % by weight.

EXAMPLE 1

Preparation of an aqueous polycarbonate dispersion 600 g of a 5% solution of polyvinyl alcohol ($M_w$ 70,000) and then 777 g water and 12 g Na dodecyl benzenesulfonate are added with intensive stirring (dissolver, 1,000 r.p.m.) to 3,000 g of a 20% solution of an aromatic polycarbonate based on bisphenol A ($M_w$ 28,000) in methylene chloride. After dispersion for another 8 to 10 minutes at 8,000 r.p.m., the methylene chloride is distilled off under normal pressure at 45° C., leaving approx. 1350 g of a 42.6% dispersion having an average particle size below 1 $\mu$m. The dispersion shows no sedimentation after 1 month.

EXAMPLE 2

Preparation of an aqueous polyester carbonate dispersion

As in Example 1, 120 g of 5% polyvinyl alcohol ($M_w$ 70,000) and then 17.3 g water and 1.6 g Na dodecyl benzenesulfonate are added with intensive stirring to 400 g of a 20% solution of an aromatic polyester carbonate consisting of 50% by weight aromatic polycarbonate based on bisphenol A and 50% by weight aromatic polyester based on bisphenol A and terephthalic acid/isophthalic acid in methylene chloride. After dispersion first at 1,000 r.p.m. and then about 8 to 10 minutes later at 7,000 r.p.m. (dissolver), the methylene chloride is distilled off and the product filtered (30,000 mesh), leaving around 200 g of a 40% dispersion having an average particle diameter of <1 $\mu$m. The dispersion shows no sedimentation after storage for 1 month.

EXAMPLE 3

A 2.2 mm thick paper board of $\alpha$-cellulose made on a paper machine is stabilized with the following two polymer dispersions:
(A) conventional commercial polychloroprene dispersion (solids content: 58%)

(b) mixture of 155.2 parts by weight of dispersion A and 23.5 parts by weight of the polycarbonate dispersion described in Example 1.

The dried paper boards had a fiber-to-polymer ratio of 70:30.

Measurement of the interbonding strength of the paper boards using an Instron model 1026 tester produced the following result (N/cm):

|  | Longitudinal | Transverse |
| --- | --- | --- |
| Latex A | 4.6 | 3.5 |
| Latex B | 6.6 | 6.1 |

The paper boards stabilized with the latices A and B are stored in hot air for 14 days at 105° C. Visual evaluation of the paper boards after ageing:
Paper board A: dark brown in color and brittle (breaks on bending)
Paper board B: pale yellow in color and still flexible.

EXAMPLE 4

Rubber films were prepared from latices A and B described in Example 3 by drying onto discs at room temperature. Comparison of the tear propagation resistance of the films (as measured in accordance with ASTM 624 C) produces the following result:
latex A 15.5 N.mm$^{-1}$
latex B 23.7 N.mm$^{-1}$.

EXAMPLE 5

The following vulcanization paste was added to polymer dispersions A and B described in Example 3:
7.5 parts by weight zinc oxide
2.0 parts by weight diphenyl thiourea
1.0 part by weight diphenyl guanidine
1.0 part by weight colloidal sulfur
2.0 parts by weight antiager
(based on 100 parts by weight polymer). Using a porcelain mold, a rubber glove was produced from the two latices by the so-called pre-dip technique. The glove had the following tear propagation resistances (as measured in accordance with ASTM 624 C).

|  | N/mm |
| --- | --- |
| Latex A | 18.7 |
| Latex B | 32.2 |

EXAMPLE 6

The following vulcanization paste was added to a polymer dispersion based on a carboxylated acrylonitrile/butadiene polymer having a solids content of 45% (latex C) and a mixture of 177.9 parts by weight of latex C and 44.4 parts by weight of the polycarbonate dispersion described in Example 2 (latex D):
1.5% by weight zinc oxide
1.5% by weight colloidal sulfur
0.6% by weight of the zinc salt of diethyl dithiocarbamate
0.4% by weight of the zinc salt of pentamethylene dithiocarbamate
0.4% by weight zinc mercaptobenzthiazole
2.0% by weight titanium dioxide
(based on 100 parts by weight polymer).

Rubber films were prepared from these mixtures by dipping porous porcelain plates therein. After drying at 130° C., the rubber films were vulcanized for 20 minutes at 105° C. Their resistance to solvents is compared by immersion in three different solvents.

| Result of increase in volume in percent: (storage time of the film samples 1 h and 2 h) | | | |
| --- | --- | --- | --- |
|  | Gasoline | Toluene | Trichloroethylene |
| Latex C 1 h | 7.0 | 500.0 | 830.0 |
| 8 h | 20.5 | 600.0 | 880.0 |
| Latex D 1 h | 3.0 | 180.0 | 245.0 |
| 8 h | 3.0 | 183.0 | 280.0 |

EXAMPLE 7

Two latex foams (density 0.093 g/cm$^3$) were compared in regard to their deformation and recovery properties. The foams were produced by the so-called "non-gel" technique using the following polymer dispersions:
Latex E:
Conventional commercial polymer dispersion based on styrenebutadiene, solids concentration 67%.
Latex F:
Mixture of 127.0 parts by weight of latex E and 35.2 parts by weight of the polycarbonate dispersion described in Example 1.

The polymers were crosslinked with a commercial vulcanization paste containing zinc oxide, sulfur and accelerator.

Testing of the foams produced the following results:

|  | Deformation pressure (25% deformation) [kg/10 cm$^2$] | Compression (load 20 kg/ 10 cm$^2$) [%] | Recovery after 60 s) [%] |
| --- | --- | --- | --- |
| Latex E | 0.61 | 15 | 93 |
| Latex F | 0.91 | 18 | 96 |

We claim:
1. Mixtures of (i) elastomer latices of 2-chlorobutadiene/methacrylic acid copolymers, 2-chlorobutadiene/dichlorobutadiene copolymers or 2-chlorobutadiene homopolymers and (ii) aqueous dispersions of aromatic polycarbonates.

2. Mixtures as claimed in claim 1, in which the elastomer component makes up from 50 to 99.9% by weight and the component (ii) is from 0.1 to 50% by weight of the total solids content.

3. A mixture of a polychloroprene latex and an aqueous dispersion of an aromatic polycarbonate in which the polychloroprene component makes up from 50 to 99.9% by weight and the polycarbonate component from 0.1 to 50% by weight of the total solids content.

4. Products obtained from the mixtures claimed in claim 1.

5. Vulcanizates obtained from the mixtures claimed in claim 1.

6. Products obtained from the mixtures claimed in claim 3.

7. Vulcanizates obtained from the mixtures claimed in claim 3.

8. Mixtures as claimed in claim 1 in which component (ii) is an aqueous dispersion of an aromatic polycarbonate based on bisphenol A.

* * * * *